(12) United States Patent
Gaurav

(10) Patent No.: US 7,743,077 B2
(45) Date of Patent: Jun. 22, 2010

(54) METHOD AND SYSTEM FOR GENERATING DATABASE RECORDS

(75) Inventor: Vishal Gaurav, Bokaro Steel (IN)

(73) Assignee: SAP AG, Walldorf (DE)

( * ) Notice: Subject to any disclaimer, the term of this patent is extended or adjusted under 35 U.S.C. 154(b) by 214 days.

(21) Appl. No.: 11/845,106

(22) Filed: Aug. 27, 2007

(65) Prior Publication Data

US 2009/0063532 A1   Mar. 5, 2009

(51) Int. Cl.
*G06F 7/00* (2006.01)
(52) U.S. Cl. .................................... 707/802; 715/744
(58) Field of Classification Search .................... None
See application file for complete search history.

(56) References Cited

U.S. PATENT DOCUMENTS

| | | | |
|---|---|---|---|
| 5,515,488 A | 5/1996 | Hoppe et al. | |
| 6,772,150 B1 | 8/2004 | Whitman et al. | |
| 7,096,229 B2 | 8/2006 | Dettinger et al. | |
| 7,194,692 B2 * | 3/2007 | Marcos et al. | 715/744 |
| 2005/0278286 A1 | 12/2005 | Djugash et al. | |
| 2006/0265344 A1 | 11/2006 | Woods | |
| 2008/0104082 A1 | 5/2008 | Gimson et al. | |

OTHER PUBLICATIONS

U.S. Appl. No. 11/617,718; Non-Final Office Action mailed Oct. 28, 2008.
U.S. Appl. No. 11/617,718; Final Office Action mailed Apr. 29, 2009.
U.S. Appl. No. 11/617,718; Non-Final Office Action mailed Sep. 23, 2009.
U.S. Appl. No. 11/626,864; Non-Final Office Action mailed Nov. 20, 2008.
U.S. Appl. No. 11/626,867; Non-Final Office Action mailed Nov. 21, 2008.
U.S. Appl. No. 11/845,107; Non-Final Office Action mailed Oct. 16, 2009.

* cited by examiner

*Primary Examiner*—Charles Rones
*Assistant Examiner*—Belix M Ortiz

(57) ABSTRACT

A method and system for generating database records is provided. A user interface element is generated for a dynamic key, the user interface element having a name field and a value input field. A generic data object is provided, the generic data object having an attribute pair and the attribute pair having a dynamic name attribute and a dynamic value attribute. The name field is bound to the dynamic name attribute and the value input field is bound to the dynamic value attribute. An instance of the attribute pair for the dynamic key is generated. A first entry from the name field is passed to the dynamic name attribute and a second entry from the value input field is passed to the dynamic value attribute. The instance of the attribute pair is saved as a record.

20 Claims, 4 Drawing Sheets

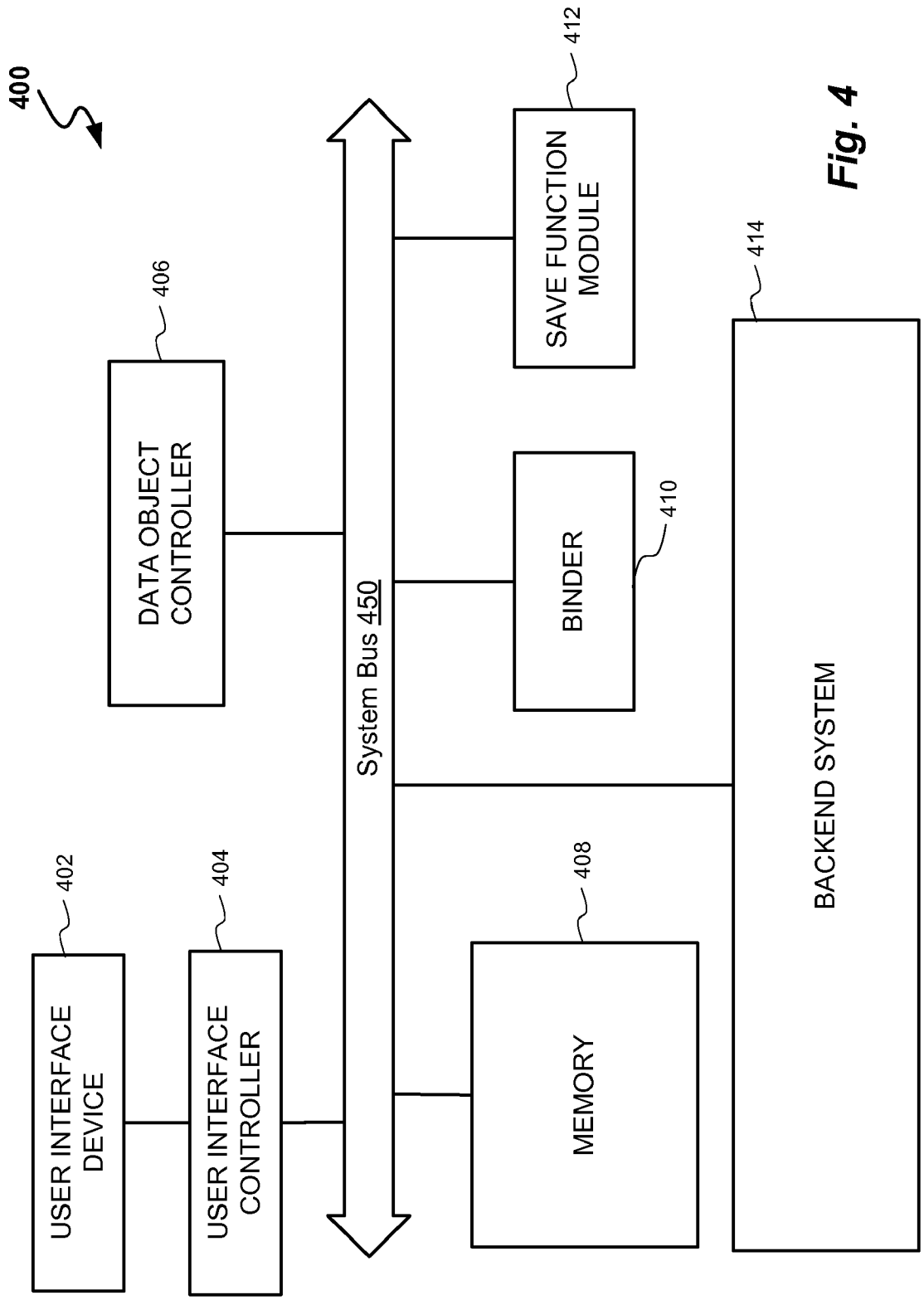

METHOD AND SYSTEM FOR GENERATING DATABASE RECORDS

TECHNICAL FIELD

Embodiments of the invention generally relate to computer systems, and more particularly, to a method and system for generating database records.

BACKGROUND

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and the records are returned as query result.

Graphical querying interfaces have been developed that help a user to query a database by dynamically specifying search conditions. In this way, the user need not rely only upon a standard set of queries provided by an application. In addition, dynamically specifying search conditions enables the user to dynamically build queries based upon the most appropriate search conditions that may return the desired data. The user is typically provided with a means to dynamically select the columns of a database table upon which the user may like to execute a search. Once one or more columns are selected, the user is generally provided with input fields for each of the selected columns. The user may then fill in the input fields with the required search parameters and execute a search in the database to retrieve the required records.

Frequently, there is a need to add new records in a database due to organizational changes, new use cases and the like. The user may want to selectively add records to one or more columns. The existing graphical query interfaces enable the user to dynamically search a database for records but do not allow the user to generate new records in the dynamically selected columns. Thus there is a need for a system that may enable the user to generate records in the dynamically selected columns.

SUMMARY OF THE INVENTION

Embodiments of the invention are generally directed to a method and system for generating database records. A user interface element is generated for a dynamic key, the user interface element having a name field and a value input field. A generic data object is provided, the generic data object having an attribute pair and the attribute pair having a dynamic name attribute and a dynamic value attribute. The name field is bound to the dynamic name attribute and the value input field is bound to the dynamic value attribute. An instance of the attribute pair for the dynamic key is generated. A first entry from the name field is passed to the dynamic name attribute and a second entry from the value input field is passed to the dynamic value attribute. The instance of the attribute pair is saved as a record.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

FIG. 4 is a block diagram of a system for generating database records useful for implementing the invention according to an embodiment of the invention.

DETAILED DESCRIPTION

Embodiments of the invention are generally directed to a method and system for generating database records. A user interface element is generated for a dynamic key, the user interface element having a name field and a value input field. A generic data object is provided, the generic data object having an attribute pair and the attribute pair having a dynamic name attribute and a dynamic value attribute. The name field is bound to the dynamic name attribute and the value input field is bound to the dynamic value attribute. An instance of the attribute pair for the dynamic key is generated. A first entry from the name field is passed to the dynamic name attribute and a second entry from the value input field is passed to the dynamic value attribute. The instance of the attribute pair is saved as a record.

Figure 1:
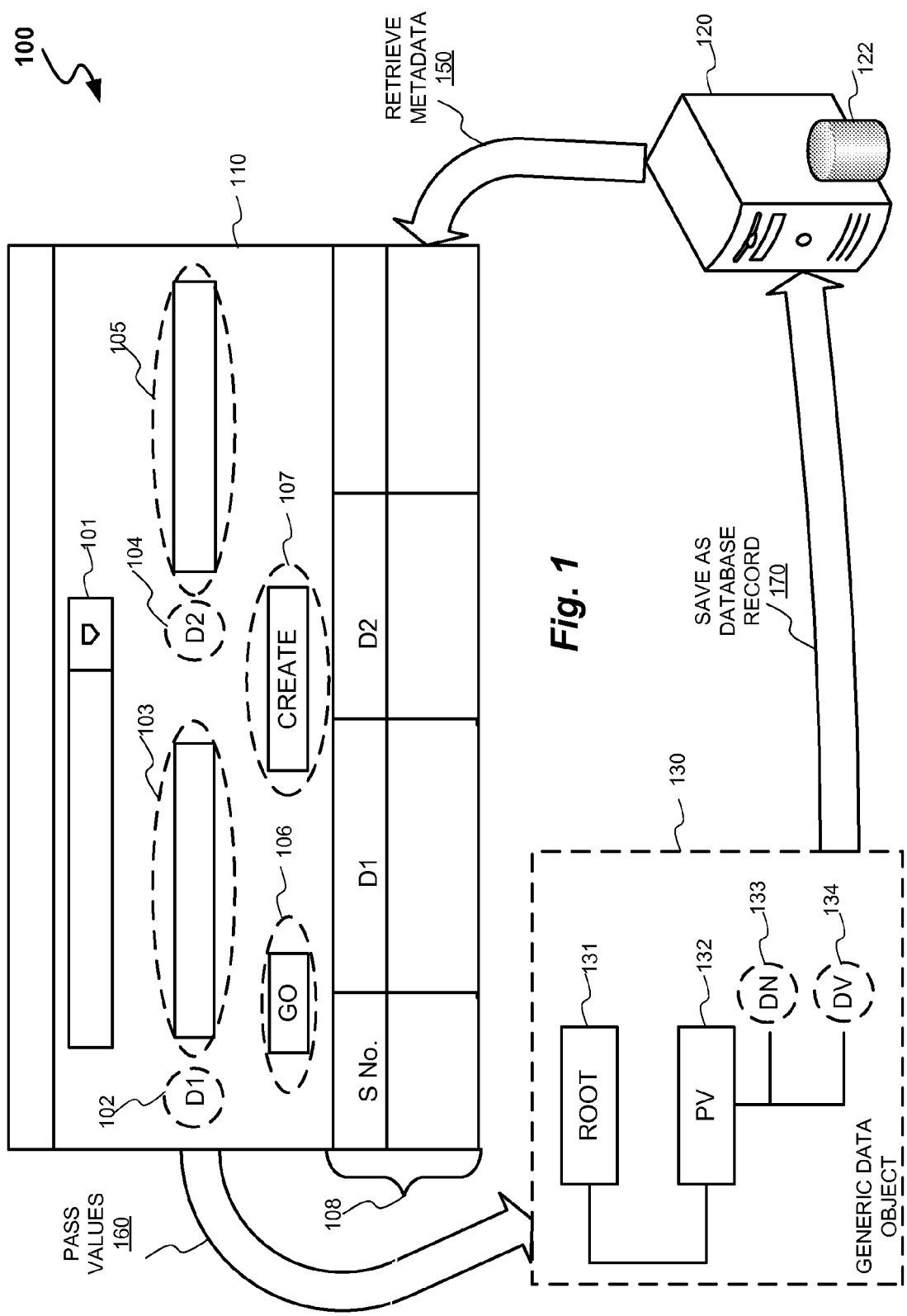
FIG. 1 is a functional block diagram of a system for generating database records according to an embodiment of the invention.

FIG. 1 is a functional block diagram of a system for generating database records according to an embodiment of the invention. Backend system 120 typically stores a number of condition types. According to one embodiment of the invention a condition type generally includes a number of semantic keys, each semantic key being associated with a column of a table stored in database 122. Each condition type typically relates to a table in database 122. According to an embodiment of the invention, database 122 is stored in backend system 120. The semantic keys of a condition type may include one or more static keys and one or more dynamic keys. The static keys are usually common across a number of condition types. A set of dynamic keys is typically unique for a condition type.

According to an embodiment of the invention, user interface portal 110 enables a user to select one or more condition types from selectable list 101 of condition types. Selection of each option from selectable list 101 of condition types may retrieve metadata relating to one or a group of condition types. Responsive to the user selecting one or a group of condition types from selectable list 101, a user selection is passed on to a query by group code. The query by group code is a logical query typically used for retrieving metadata for a number of semantic keys (including dynamic and static keys) from database 122. The query by group code typically includes an input parameter node and a result node as associated nodes. The input parameter node generally provides a structure for query conditions upon which a search may be conducted. The result node generally provides a structure for storing results that are generated by executing the query by group code. The user selection is typically passed on as input parameters to the input parameter node of the query by group code. The query by group code is then executed to search database 122 based upon the input parameters. The metadata of the semantic keys (including static and dynamic keys) belonging to the selected condition types is retrieved 150 as a result and stored in the result node of the query by group code. In one embodiment of the invention the metadata for each semantic key is stored as a separate record in the result node. The metadata for each semantic key of a condition type may include a user interface type, name of a field, type of a field, label of a field, a tool tip or a sync code. User interface elements 102, 103, 104, 105, 106, 107 and 108 are generated for the semantic keys of the selected condition type from the retrieved metadata stored in the result node and displayed to the user through user interface portal 110.

Generation of the user interface elements typically includes dynamically creating a form having name fields and value input fields for each semantic key and push buttons for performing tasks and dynamically associating the push buttons with actions. The tasks for which push buttons are created include clearing the fields, saving a query, deleting a query, modifying a query, generating database records and initiating a search based upon the values of the semantic keys. The push buttons may be associated with actions such as a mouse click or press of a button on a key board. 102 is the name field for the dynamic key D1 and 103 is the value input field for the dynamic key D1. Similarly 104 is the name field for the dynamic key D2 and 105 is the value input field for the dynamic key D2. A user may enter values in each of the created value input fields 103 and 105 to build up a query and search database 122 to retrieve the desired results. Search push button 106 enables a user to search database 122 based upon the values in the value input fields 103 and 105. Create push button 107 enables a user to generate and save new records in a database table stored in database 122. 108 is typically a table for displaying the records retrieved from database 122 after the execution of a search by the user.

The user may add and save new records to the database table stored in database 122 by filling values in value input fields 103 and 105. Generic data object 130 enables the user to generate new database records and save the database records in the database table. Generic data object 130 includes root node 131 and property valuation node 132. Root node 131 typically provides a structure for the temporary storage of static keys data and property valuation node 132 provides a structure for the temporary storage of dynamic keys data. Property valuation node 132 further includes an attribute pair having dynamic name attribute 133 and dynamic value attribute 134. Dynamic name attribute 133 temporarily stores a name in the name fields 102 and 104.

Dynamic value attribute 134 temporarily stores a value in the value input fields 103 and 105. Name fields 102 and 104 are bound to dynamic name attribute 133. Similarly value input fields 103 and 105 are bound to dynamic value attribute 134. In one of the embodiments of the invention, a separate instance of the attribute pair is generated for storing each pair of the name and the value. For example the name D1 in name field 102 and the value filled in value input field 103 may be stored as a separate instance of the attribute pair According to an embodiment of the invention the user fills in the values in value input fields 103 and 105 corresponding to name fields 102 for dynamic key D1 and 104 for dynamic key D2 respectively. The user then clicks on create push button 107 for initiating the generation and saving of the values in the value input fields 103 and 105 to the database table. Upon clicking create push button 107, the name D1 in name field 102 and value filled in by the user in value input field 103 are passed on 160 to dynamic name attribute and dynamic value attribute respectively of an attribute instance. Similarly, name D2 in name field 104 and the value filled in by the user in value input field 105 are passed on 160 to dynamic name attribute 133 and dynamic value attribute 134 respectively of a separate attribute instance.

According to an embodiment of the invention, the name fields 102 and 104 may be bound to dynamic name attribute 133 either when user interface elements 102, 104, 105, 106, 107 and 108 are generated or upon clicking create pushbutton 107 by the user. Similarly value input fields 103 and 105 may be bound to dynamic value attribute 134 either when user interface elements 102, 104, 105, 106, 107 and 108 are generated or upon clicking create pushbutton 107 by the user.

All the instances of the attribute pair together are saved 170 as a new record in the database table stored in database 122. According to an embodiment of the invention a save function is called from backend system 120 and executed to save the instances of the attribute pair in to the database table.

Figure 2:
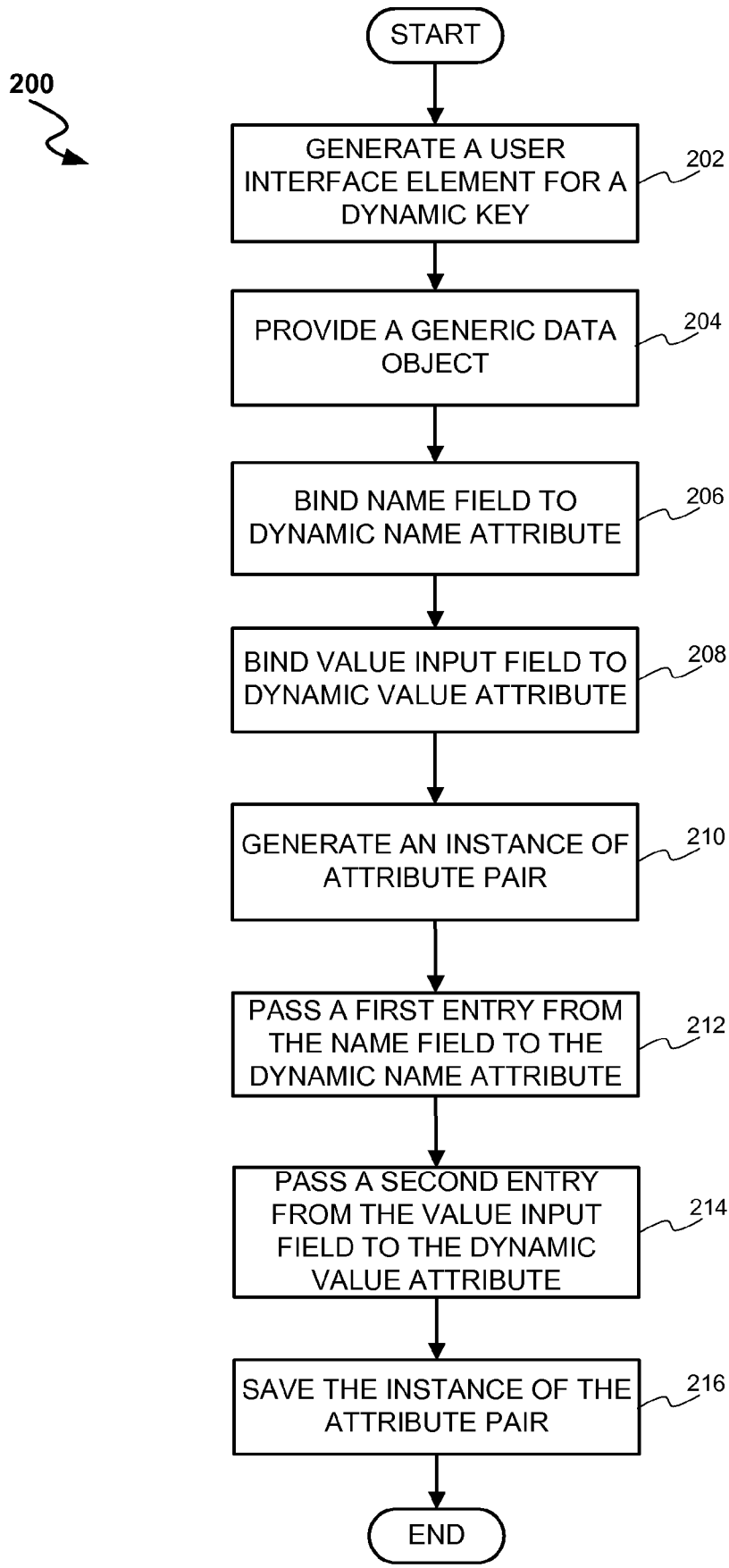
FIG. 2 is a flow diagram of a process for generating database records according to an embodiment of the invention.

FIG. 2 is a flow diagram of a process 200 for generating database records according to an embodiment of the invention. In process block 202, a user interface element is generated for a dynamic key. The user interface element has a name field and a value input field. A metadata for the dynamic key is usually received from a backend system and used to generate the user interface element. In process block 204, a generic data object is provided. The generic data object has an attribute pair. The attribute pair includes a dynamic name attribute and a dynamic value attribute. The data object typically includes a root node and a property valuation node. The attribute pair is typically a part of the property valuation node. In process block 206, the name field is bound to the dynamic name attribute. In process block 208, the value input field is bound to the dynamic value attribute. In process block 210 an instance of the attribute pair is generated. In process block 212, a first entry from the name field is passed to the dynamic name attribute. The first entry is typically a name of the dynamic key. In process block 214 a second entry from the value input field is passed on to the dynamic value attribute. The second entry is typically a value filled in the value input field by a user. Finally in process block 216, the instance of the attribute pair is saved as a record in a database table. Process 200 is then terminated.

Figure 3:
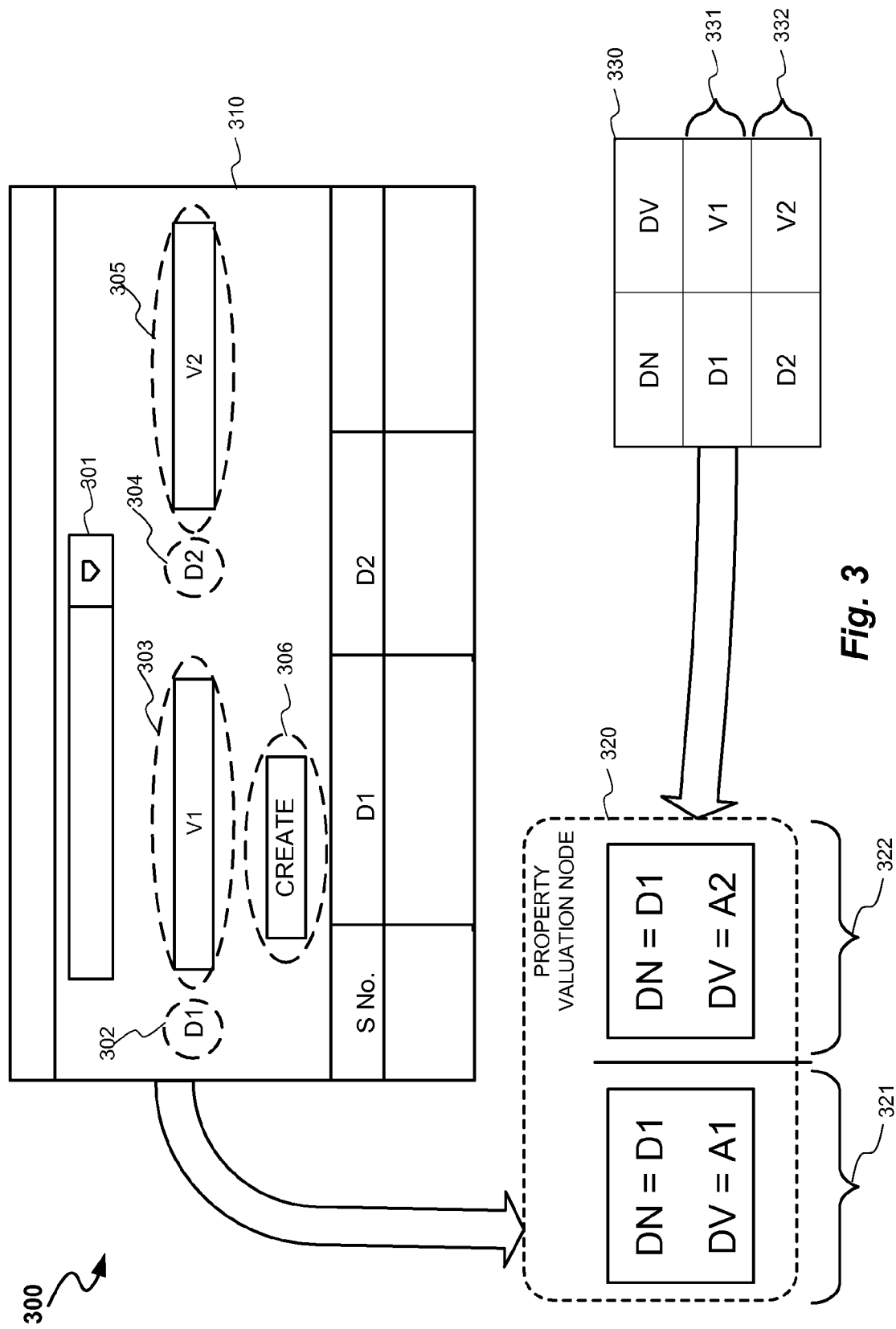
FIG. 3 illustrates the generation of database records according to an embodiment of the invention.

FIG. 3 illustrates the generation of database records 300 according to an embodiment of the invention. User interface portal 310 enables a user to select one or more condition types from selectable list 301 of condition types. Selection of each option from selectable list 301 of condition types may retrieve metadata relating to one or a group of condition types. Responsive to the user selecting one or a group of condition types from selectable list 301, a user selection is passed on to a query by group code for retrieving the metadata for a number of semantic keys (including dynamic and static keys) from a database. User interface elements 302, 303, 304, 305 and 306 are generated for the semantic keys of the selected condition type from the retrieved metadata and displayed to the user through user interface portal 310. 302 is the name field for the dynamic key D1 and 303 is the value input field for the dynamic key D1. Similarly 304 is the name field for the dynamic key D2 and 305 is the value input field for the dynamic key D2. Create push button 306 enables a user to generate and save new records in a database table stored in the database.

Property valuation node 320 provides a structure for the temporary storage of dynamic keys data. Property valuation node 320 includes an attribute pair having dynamic name attribute DN and dynamic value attribute DV. Dynamic name attribute DN temporarily stores one or more names in the name fields 302 and 304. Dynamic value attribute DV temporarily stores one or more values in the value input fields 303 and 305. The name fields 302 and 304 are bound to dynamic name attribute DN. Similarly value input fields 303 and 305 are bound to dynamic value attribute DV.

Instance 321 of the attribute pair temporarily stores name D1 in name field 302 and value VI in value input field 303. Similarly instance 322 of the attribute pair temporarily stores name D2 in name field 304 and value VI in value input field 305.

According to an embodiment of the invention, property valuation node 320 stores each instance 321 and 322 of the attribute pair as a separate record in temporary table 330. As shown in the figure, name D1 and value VI are stored as record 331 in temporary table 330 and name D2 and value V2 are stored as record 332 in temporary table 330. Records 331 and 332 are finally saved permanently in a database table.

FIG. 4 is a block diagram of a system 400 for generating database records useful for implementing the invention according to an embodiment of the invention. Backend system 414 typically stores a number of condition types. According to one embodiment of the invention a condition type generally includes a number of semantic keys, each semantic key being associated with a column of a table stored in a database. Each condition type typically relates to a table in the database. According to an embodiment of the invention, the database is stored in backend system 414. The semantic keys of a condition type may include one or more static keys and one or more dynamic keys.

According to an embodiment of the invention, user interface device 402 provides a user interface portal that enables a user to select one or more condition types from a selectable list of condition types. A selection of each option from the selectable list of condition types may retrieve metadata relating to one or a group of condition types. Responsive to the user selecting one or a group of condition types from the selectable list, metadata for all the semantic keys in the selected condition type is retrieved from backend system 414 and typically stored in memory 408. User interface controller 404 generates user interface elements for the semantic keys (typically both static keys and dynamic keys) using the metadata retrieved from backend system 414 and displays the user interface elements on user interface device 402.

Generation of the user interface elements by user interface controller 404 typically includes dynamically creating a form having name fields and value input fields for each semantic key and push buttons for performing tasks and dynamically associating the push buttons with actions. The tasks for which push buttons are created include clearing the fields, saving a query, deleting a query, modifying a query, creating database records and initiating a search based upon the values of the semantic keys. The push buttons may be associated with actions such as a mouse click or a press of a button on a key board. The user may generate and save new records to a database table stored in the database by filling values in the value input fields Memory 408 stores a generic data object having an attribute pair. The generic data object enables the user to generate new records and save the records in the database table. The generic data object includes a root node and a property valuation node. The root node typically provides a structure for the temporary storage of static keys data in memory 408 and the property valuation node provides a structure for the temporary storage of dynamic keys data in memory 408. The property valuation node further includes an attribute pair having a dynamic name attribute and a dynamic value attribute. The dynamic name attribute temporarily stores one or more names in the name fields. The dynamic value attribute temporarily stores one or more values in the value input fields.

Binder 410 binds the name fields to the dynamic name attribute and the value input fields to the dynamic value attribute. Data object controller 406 generates separate instances of the attribute pair for storing each pair of the names and the values.

According to an embodiment of the invention the user fills in the values in the value input fields corresponding to the name fields for a dynamic key through user interface device 402. The user then initiates the generation and saving of the values in the value input fields to the database table. The user typically initiates the generation and saving by clicking a create push button on user interface device 402. Upon initiating the generation and saving by the user on user interface device 402, data object controller 406 passes the names in the name fields to the dynamic name attribute and the values in the value input fields to the dynamic value attribute. Each pair of the names and values for a dynamic key is typically passed on to a separate instance of the attribute pair.

All the instances of the attribute pair together are saved as a new record in the database table by save function module 412. According to an embodiment of the invention save function module 412 makes a call to a save function from backend system 414 and executes the save function to save the instances of the attribute pair in to the database table.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, other type of machine-readable media suitable for storing electronic instructions. The invention may be downloaded as a computer program which may be transferred from a remote computer (e.g., a server) to a requesting computer (e.g., a client) by way of a communication link (e.g., a modem or network connection).

What is claimed is:

1. A computer implemented method to generate a database record, the method comprising:
    from a user interface, receiving a user selection of a condition type for querying a database associated with the condition type;
    in response to the user selection, identifying a query by group code to search for metadata associated with the condition type;
    executing the identified query by group code to retrieve the metadata associated with the condition type;
    based upon the retrieved metadata, configuring the user interface to generate a user interface element comprising a static key and a dynamic key, the dynamic key comprising a name field and a value input field;
    based upon the user interface element, generating a generic data object comprising a root node and a property valuation node, the property valuation node including an attribute pair, the attribute pair comprising a dynamic name attribute and a dynamic value attribute;
    binding the user interface element to the generic data object to pass a user entry received at the user interface element to the generic data object, by
        binding the static field to the root node, and
        binding the dynamic field to the property valuation node, by binding the name field to the dynamic name attribute and the value input field to the dynamic value attribute; and
    based upon the user entry to the user interface, generating the database record for an instance of the attribute pair, the instance of the attribute pair generated for the user entry bound to the dynamic field.

2. The computer implemented method of claim 1, wherein the root node provides a structure for storing static key data.

3. The computer implemented method of claim 1, wherein the property valuation node provides a structure for storing the attribute pair data, with the dynamic name attribute storing a name field data and the dynamic value attribute storing a value input field data.

4. A computing device to generate a database record comprising:
    a user interface device to receive a selection of a condition type for querying a database associated with the condition type;
    a backend system to identify a query by group code to search for metadata associated with the condition type and executing the query by group code to retrieve the metadata;
    a user interface controller to configure the user interface device to generate a user interface element comprising a static key and a dynamic key, the dynamic key comprising a name field and a value input field and to generate a generic data object based upon the user interface element;
    a memory electronically coupled to the user interface controller to store a generic data object, the generic data object comprising a root node and a property valuation node, the property valuation node including an attribute pair, the attribute pair comprising a dynamic name attribute and a dynamic value attribute;
    a binder electronically coupled to the user interface controller and the memory to bind the user interface element to the generic data object to pass a user entry received at the user interface element to the generic data object, by binding the static field to the root node and binding the dynamic field to the property valuation node, by binding the name field to the dynamic name attribute and the value input field to the dynamic value attribute;
    a data object controller electronically coupled to the user interface controller, the memory and the binder to generate the database record for an instance of the attribute pair, the instance of the attribute pair generated for the user entry bound to the dynamic field and storing the instance of the attribute pair in the memory.

5. A machine-accessible medium that provides instructions that, when executed by a machine, cause the machine to perform operations comprising:
    from a user interface, receiving a user selection of a condition type for querying a database associated with the condition type;
    in response to the user selection, identifying a query by group code to search for metadata associated with the condition type;
    executing the identified query by group code to retrieve the metadata associated with the condition type;
    based upon the retrieved metadata, configuring the user interface to generate a user interface element comprising a static key and a dynamic key, the dynamic key comprising a name field and a value input field;
    based upon the user interface element, generating a generic data object comprising a root node and a property valuation node, the property valuation node including an attribute pair, the attribute pair comprising a dynamic name attribute and a dynamic value attribute;
    binding the user interface element to the generic data object to pass a user entry received at the user interface element to the generic data object, by
        binding the static field to the root node, and
        binding the dynamic field to the property valuation node, by binding the name field to the dynamic name attribute and the value input field to the dynamic value attribute; and
    based upon the user entry to the user interface, generating the database record for an instance of the attribute pair, the instance of the attribute pair generated for the user entry bound to the dynamic field.

6. The machine-accessible medium of claim 5, wherein the root node provides a structure for storing static key data.

7. The machine-accessible medium of claim 5, wherein the property valuation node provides a structure for storing the attribute pair data, with the dynamic name attribute storing a name field data and the dynamic value attribute storing a value input field data.

8. The computer implemented method of claim 1 further comprising:
    passing a first entry from the name field to the dynamic name attribute; and
    passing a second entry from the value field to the dynamic value attribute.

9. The computer implemented method of claim 1 further comprising saving the instance of the attribute pair as a record in a backend system.

10. The computer implemented method of claim 9 further comprising generating an instance of the attribute pair for each pair of name field data and value input field data.

11. The computer implemented method of claim 10 further comprising storing one or more instances of the attribute pair in a database table.

12. The computer implemented method of claim 1, wherein generating a user interface element comprises:
   creating a form including a name field and a value input field for each dynamic key;
   creating one or more push buttons for performing a corresponding one or more tasks; and
   dynamically associating the push buttons with the tasks.

13. The computer implemented method of claim 12, wherein associating the push button with the tasks comprises associating the push button with an action from a group consisting of clearing a field, saving a query, deleting a query, modifying a query, generating a database record and initiating a search.

14. The computer implemented method of claim 1, wherein identifying the query by group code comprises identifying an instance of the query by group code, the instance of the query by group code created based upon metadata of a selected condition type.

15. The computing device of claim 4, wherein the data object controller passes a first entry from the name field to the dynamic name attribute and passes a second entry from the value field to the dynamic value attribute.

16. The computing device of claim 4 further comprising a save function module to save the instance of the attribute pair as a record in a backend system.

17. The machine-accessible medium of claim 5, wherein the method further comprises saving the instance of the attribute pair as a record in a backend system.

18. The machine-accessible medium of claim 5, wherein the method further comprises generating an instance of the attribute pair for each pair of name field data and value input field data.

19. The machine-accessible medium of claim 5, wherein the method further comprises storing one or more instances of the attribute pair in a database table.

20. The machine-accessible medium of claim 5, wherein generating a user interface element comprises:
   creating a form including a name field and a value input field for each dynamic key;
   creating one or more push buttons for performing a corresponding one or more tasks; and
   dynamically associating the push buttons with the tasks.

* * * * *